(12) United States Patent
Behrens

(10) Patent No.: US 9,921,084 B2
(45) Date of Patent: Mar. 20, 2018

(54) FASTENING DEVICE FOR A SENSOR AT A FITTING

(71) Applicant: SICK AG, Waldkirch (DE)

(72) Inventor: Andreas Behrens, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 15/141,993

(22) Filed: Apr. 29, 2016

(65) Prior Publication Data

US 2016/0363467 A1    Dec. 15, 2016

(30) Foreign Application Priority Data

Jun. 10, 2015   (DE) .................. 10 2015 109 142

(51) Int. Cl.
   *G01D 11/30*   (2006.01)

(52) U.S. Cl.
   CPC .................... *G01D 11/30* (2013.01)

(58) Field of Classification Search
   CPC .......... G01D 11/30; G01J 1/0403; F16B 2/06; F16B 2/12; F16B 2/10
   USPC ..................... 248/63, 64, 74, 689
   See application file for complete search history.

(56) References Cited

U.S. PATENT DOCUMENTS

| 709,816 | A | * | 9/1902 | Collins | ..................... F16B 2/12 248/228.3 |
|---|---|---|---|---|---|
| 2,649,640 | A | * | 8/1953 | Deutsch | ..................... F16B 2/06 403/191 |
| 4,767,087 | A | * | 8/1988 | Combu | ..................... F16L 3/11 248/324 |
| 5,169,177 | A | * | 12/1992 | McLennan | ............. A62C 35/68 285/197 |
| 8,608,118 | B2 | * | 12/2013 | Lai | ........................ F16B 7/1454 248/74.1 |
| 2008/0287271 | A1 | * | 11/2008 | Jones | ................. A63B 21/0728 482/107 |
| 2013/0177353 | A1 | * | 7/2013 | Dunn | .................... A01B 59/002 403/374.2 |
| 2014/0200093 | A1 | * | 7/2014 | Parke | ..................... G01P 1/023 473/223 |

FOREIGN PATENT DOCUMENTS

| DE | 10 2007 023 802 A1 | 11/2008 |
|---|---|---|
| DE | 202010002817 U1 | 2/2011 |
| DE | 10 2012 021 891 A1 | 5/2013 |
| DE | 10 2013 113 537 A1 | 6/2014 |

* cited by examiner

*Primary Examiner* — Muhammad Ijaz
(74) *Attorney, Agent, or Firm* — Nath, Goldberg & Meyer; Jerald L. Meyer; Annie J. Kock

(57) ABSTRACT

A fastening device for a sensor at a fitting including a quick clamping mechanism (4) which clamps the fitting (14), characterized in that the quick clamping mechanism (4) is supported at a first holding part (2) which is connected to a second holding part (3) which supports the sensor (12), with the first holding part and the second holding part (2, 3) forming a clamping device, wherein the first holding part (2) includes two hoops (5, 6), wherein at least one hoop (5) engages behind a fitting support unit (10) of the second holding part (3) and the quick clamping mechanism (4) is fastened between the two hoops (5, 6) of the first holding part (2), wherein the quick clamping mechanism (4) is led or rotatably supported at an axle (9) which connects the hoops (5, 6).

5 Claims, 1 Drawing Sheet

FASTENING DEVICE FOR A SENSOR AT A FITTING

FIELD OF THE INVENTION

The invention relates to a fastening device for a sensor at a fitting including a quick clamping mechanism which clamps the fitting.

BACKGROUND

It is customary in automation technology that sensors are fastened to a mounting bar. The sensors are thereby installed in space exactly where the object is located which should be detected by the sensor. The mounting bar is in this respect a component of a bar holding system, wherein the mounting bar has a round profile.

A holder for fastening a sensor to a fitting is known from DE 10 2013 113 537 A1, wherein the holder is provided with a quick clamping mechanism. The holder is connected to a sensor holder via a connection element, wherein the clamping force between the holder and the sensor and between the holder and the fitting is different. In this respect, at least one tool is required for fastening and releasing or readjusting the sensor.

DE 10 2012 021 891 A1 discloses an apparatus for fastening a sensor housing to a bar having two mutually parallel clamping plates.

DE 10 2007 023 802 A1 discloses a clamp-on flow meter for fastening to a pipe line.

SUMMARY

It is the underlying object of the invention to provide a fastening device for a sensor at a fitting at which both the installation and the alignment of the sensor can be carried out simply and without a tool.

The object is satisfied in accordance with the invention in that the quick clamping mechanism is supported at a first holding part which is connected to a second holding part which supports the sensor, with the first holding part and the second holding part forming a clamping device, wherein the first holding part includes two hoops, wherein at least one hoop engages behind a fitting support unit of the second holding part and the quick clamping mechanism is fastened between the two hoops of the first holding part, wherein the quick clamping mechanism is led or rotatably supported at an axle which connects the hoops.

This has the advantage that the sensor can be installed simply without a tool with all degrees of freedom such as the height of the position at the mounting bar, the rotation about the mounting bar and the inclination relative to the mounting bar. The quick clamping mechanism between the two holding parts in this respect effects a fixed position of the sensor. Such a fastening device is independent of the materials used, which allows a cost-favorable manufacture. Tools for the installation can be dispensed with.

In this respect, the first holding part includes two hoops, wherein at least one hoop engages behind a fitting support unit of the second holding part. The first holding part and the second holding part can be connected simply in one working step by this engaging behind, wherein additional components for reinforcing the connection can be dispensed with.

In accordance with the invention, the quick clamping mechanism is fastened between the two hoops of the first holding part, wherein the quick clamping mechanism is led or rotatably supported at an axle which connects the hoops. Additional holding elements which fasten the quick clamping mechanism to the first holding part are thus dispensed with. The mounting of the quick clamping mechanism between the hoops in this respect forms a position which is favorable in terms of function since the fitting is inserted directly beneath the quick clamping mechanism.

In an embodiment, the fitting support unit is connected to a sensor carrier. A simple but nevertheless robust unit for fastening the sensor is provided by a fixed connection of the fitting support unit to the sensor carrier.

In an embodiment, the sensor is clipped into the sensor carrier. For this purpose, the sensor carrier has projections which engage at the sensor and which can be simply introduced in an installation step, whereby the fastening process is simplified.

In an alternative, the sensor is directly fastened to the fitting support unit. This is in particular always possible when the sensor in turn has a mechanical universal connection, for example, a dovetail or a bayonet connection.

In a further development, the fitting support unit is rotatably mounted. The fitting support unit can be moved by this rotatable mounting in any desired manner in the desired degree of freedom and the sensor can thus be fixed to the mounting bar in the desired direction.

In a further embodiment, the quick clamping mechanism is configured as a lever element. The fastening device can thereby be fastened to the fitting by a simple actuation.

The axle of the quick clamping mechanism is formed asymmetrically to a pressing member of the quick clamping mechanism so that the quick clamping mechanism only gradually releases the fitting on the release of the quick clamping mechanism. The pressing member lies on the fitting in the closed state of the quick clamping mechanism and is slowly lifted off from the fitting on the opening of the quick clamping mechanism.

In an embodiment, the quick clamping mechanism has a securing device at a free end. This securing device can, for example, be configured as an elongate hole, whereby an additional securing of the quick clamping mechanism at the fitting is possible via a simple cable tie. An unwanted opening of the quick clamping mechanism is thereby reliably prevented.

The invention allows a large number of embodiments. One of them will be explained in more detail with reference to the Figures shown in the drawing.

BRIEF DESCRIPTION OF THE DRAWINGS

There are shown.

DETAILED DESCRIPTION

Figure 1:
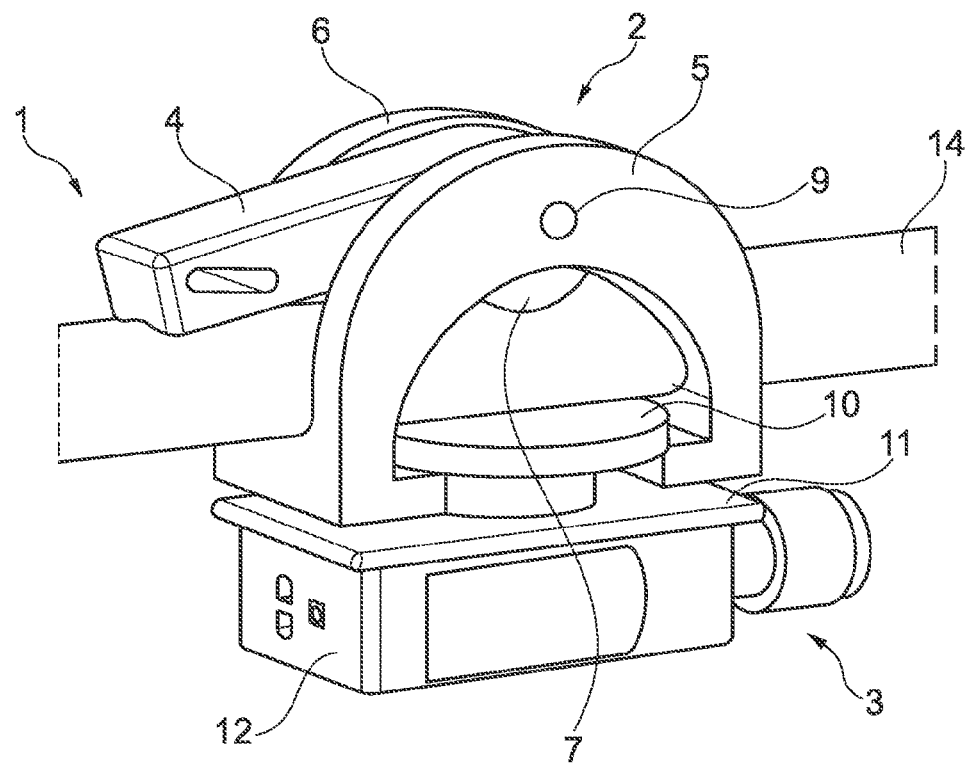
FIG. 1 an embodiment of the fastening device in accordance with the invention.

In FIG. 1, an embodiment of the fastening device 1 in accordance with the invention is shown which comprises two holding parts 2, 3. The first holding part 1 has a quick clamping mechanism 4 which is configured as a lever device. The quick clamping mechanism 4 is led at an axle 9 which connects two hoops 5, 6 of the first holding part 2 of the quick clamping mechanism 4. The hoops 5, 6 have openings which are not shown further, into which the axle 9 of the quick clamping mechanism 5 is introduced. In the region of the axle 9, the quick clamping mechanism 4 has a pressing member 7 formed with a rounded feature. In this respect, at least one hoop 5 engages behind a rotatably mounted fitting support unit 10 of the second holding part 3 in that the hoop 5 has two projections angled at 90° to the hoop 5. The first holding part 2 can in this respect be designed such that the second holding part 3 can only be pushed into the first holding part 2 from one side. The first holding part 2 can furthermore be designed such that the second holding part 3 easily latches in downwardly after the pushing in, whereby it can be rotated more easily.

The axle 9 can alternatively be of a different material than the quick clamping mechanism 4. The axle 9 can, for example, comprise metal, whereas the quick clamping mechanism 4 is made of plastic.

The rotatably mounted fitting support unit 10 is a component of the second holding part 3 and is fixedly connected to a sensor carrier 11. The sensor 12 is fastened to the sensor carrier 11.

Figure 2:
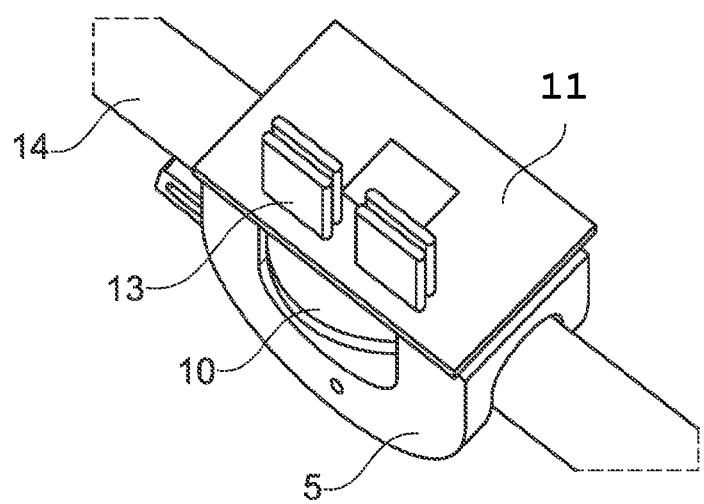
FIG. 2 a plan view of a sensor carrier of the fastening device in accordance with FIG. 1

As can be seen from FIG. 2, in which a plan view of the sensor carrier 11 is shown from below, two latch projections 13 into which the sensor 12 is clipped are arranged at the sensor carrier 12. In this connection, the mechanical fastening of the sensor 12 takes place by latching the sensor 12 onto the sensor carrier 11 designed for the sensor 12. This can be designed in a differentiated manner for a specific sensor type in each case.

The sensor carrier 11 is not required when the sensor 12 already has a mechanical universal connection such as e.g. a dovetail or a bayonet connection. In this case, the sensor 12 can be directly fastened to the fitting support unit 10.

With an open quick clamping mechanism 4, the fitting 14 is pushed in between the two hoops 5, 6 of the first holding part 2 and the quick clamping mechanism 4 is subsequently closed, with the pressing member 7 of the quick clamping mechanism 4 pressing the fitting 14 against the fitting support unit 10. In this respect, the fitting 14 is clamped firmly between the first holding part and the second holding part 2, 3. If the quick clamping mechanism 4 is released upwardly, the fitting 14 is released more and more since the axle 9 of the quick clamping mechanism 4 is arranged asymmetrically to the pressing member 7 which presses onto the fitting 14. In the released state, the second holding part 3 can be rotated into any desired position due to the rotatable mounting of the fitting holding part 10.

Alternative bores which are not shown further can be provided in the hoops 5, 6 for the axle 9 of the quick clamping body 10 in order, for example, to also be able to firmly clamp fittings 14 of smaller diameter.

On the installation of the first holding part 2, it is advantageous if the quick clamping mechanism 4 can only be connected to the axle 9 after engaging around the fitting 14. For this purpose, the axle, ideally as a pluggable axle, is provided with a head (not shown) at one end, said head preventing a sliding through of the axle 9 in the non-clamped state of the fastening device. The holding part 2 having two hoops 5, 6 can thus also be fastened to a fitting 14 if said fitting 14 is already equipped with other components above or below and a pushing on of the holding part 2 is no longer possible.

A fastening device for a sensor which can be actuated without an additional tool is presented by means of the described solution. Installation times are thereby reduced. The fastening device can in this respect be manufactured completely from plastic in a cost-favorable manner.

The invention claimed is:

1. A fastening device with a sensor supported at a fitting, comprising:
   a quick clamping mechanism, configured as a lever element terminating with a pressing member having a rounded feature, which clamps the fitting by lever operation;
   a first holding part supporting the quick clamping mechanism, the first holding part connected to a second holding part which supports the sensor, with the first holding part and the second holding part forming a clamping device;
   the first holding part comprising two hoops, wherein at least one of said two hoops engages behind a fitting support unit of the second holding part and the quick clamping mechanism fastened between the two hoops of the first holding part, wherein the fitting support unit is rotatably mounted; and
   an axle connecting the two hoops and positioned asymmetrically with respect to the rounded feature of the pressing member, the quick clamping mechanism rotatably supported at the axle so as to cause the pressing member to press against the fitting upon rotation about the axle and cause the fitting to press against the fitting support unit.

2. The fastening device in accordance with claim 1, wherein the fitting support unit is connected to a sensor carrier into which the sensor can be clipped.

3. The fastening device in accordance with claim 1, wherein the sensor is directly fastened to the fitting support unit.

4. The fastening device in accordance with claim 1, wherein the axle is provided with a head at one end, said head preventing the axle from sliding through the first holding part.

5. The fastening device in accordance with claim 1, wherein the quick clamping mechanism has a securing device at a free end.

* * * * *